Feb. 18, 1941.  E. R. BERGMANN  2,232,650
SHAKER CONVEYER
Filed Aug. 25, 1939  3 Sheets-Sheet 1
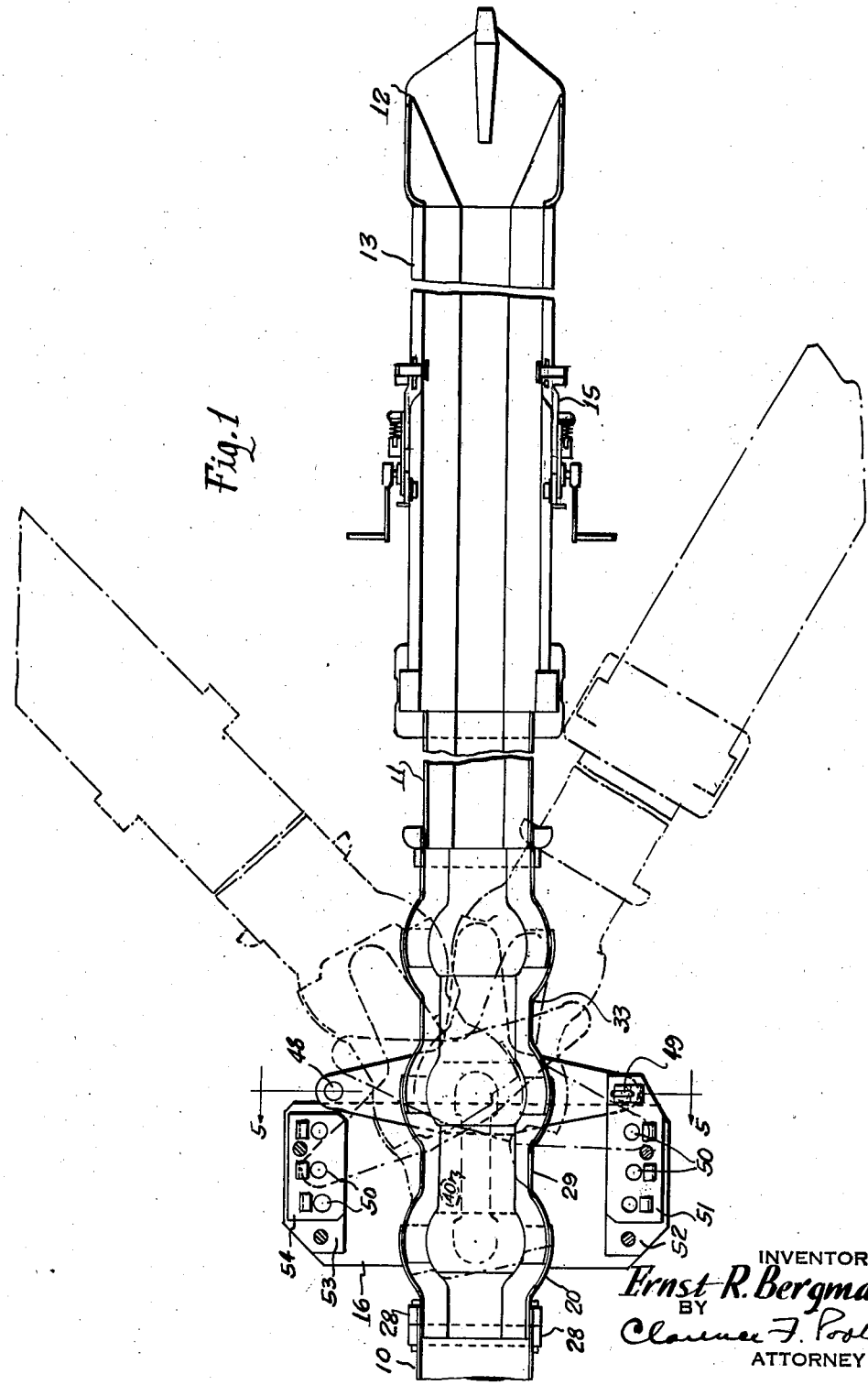
INVENTOR
Ernst R. Bergmann
BY
Clarence F. Poole
ATTORNEY

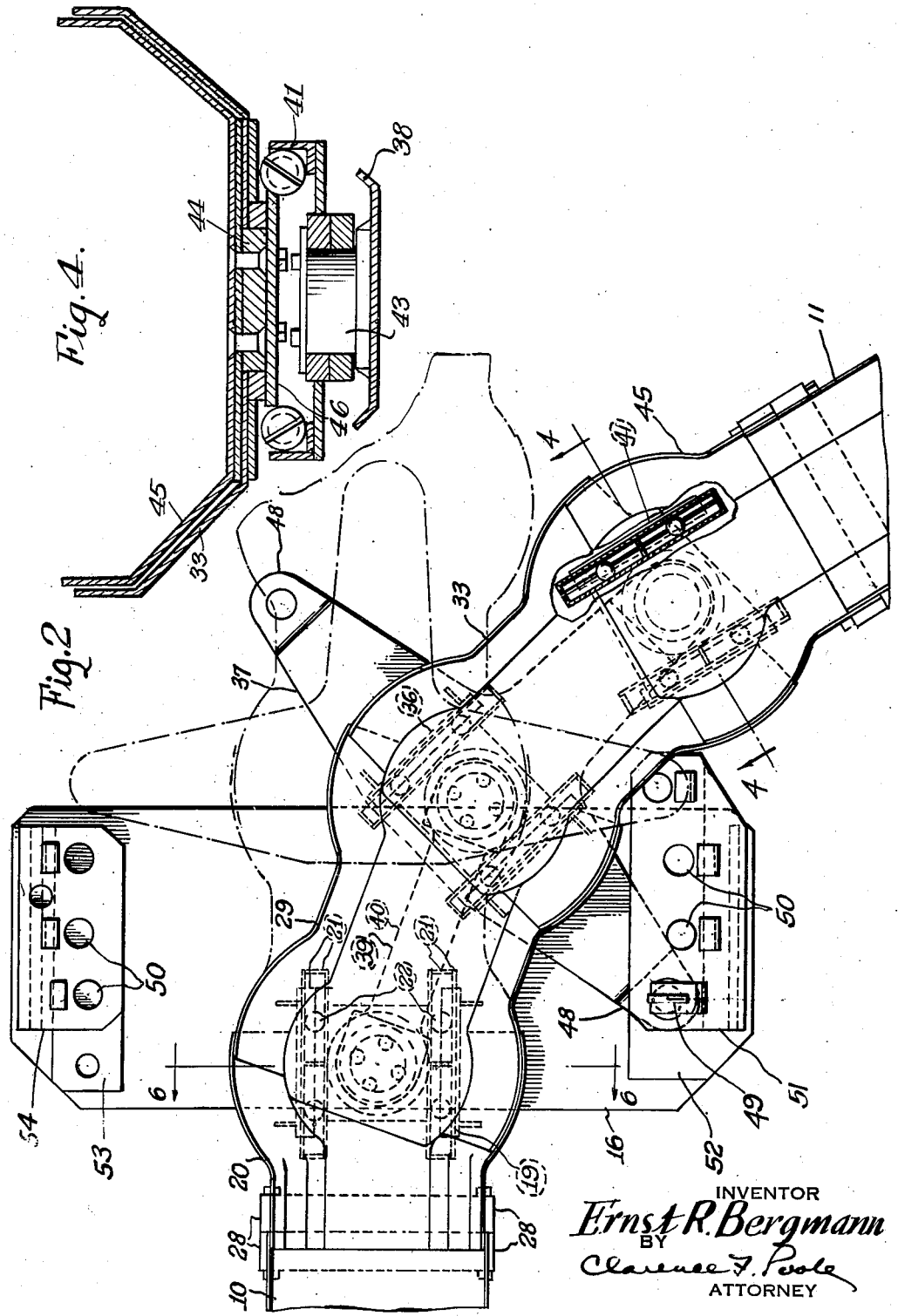

Feb. 18, 1941.     E. R. BERGMANN     2,232,650
SHAKER CONVEYER
Filed Aug. 25, 1939     3 Sheets-Sheet 3
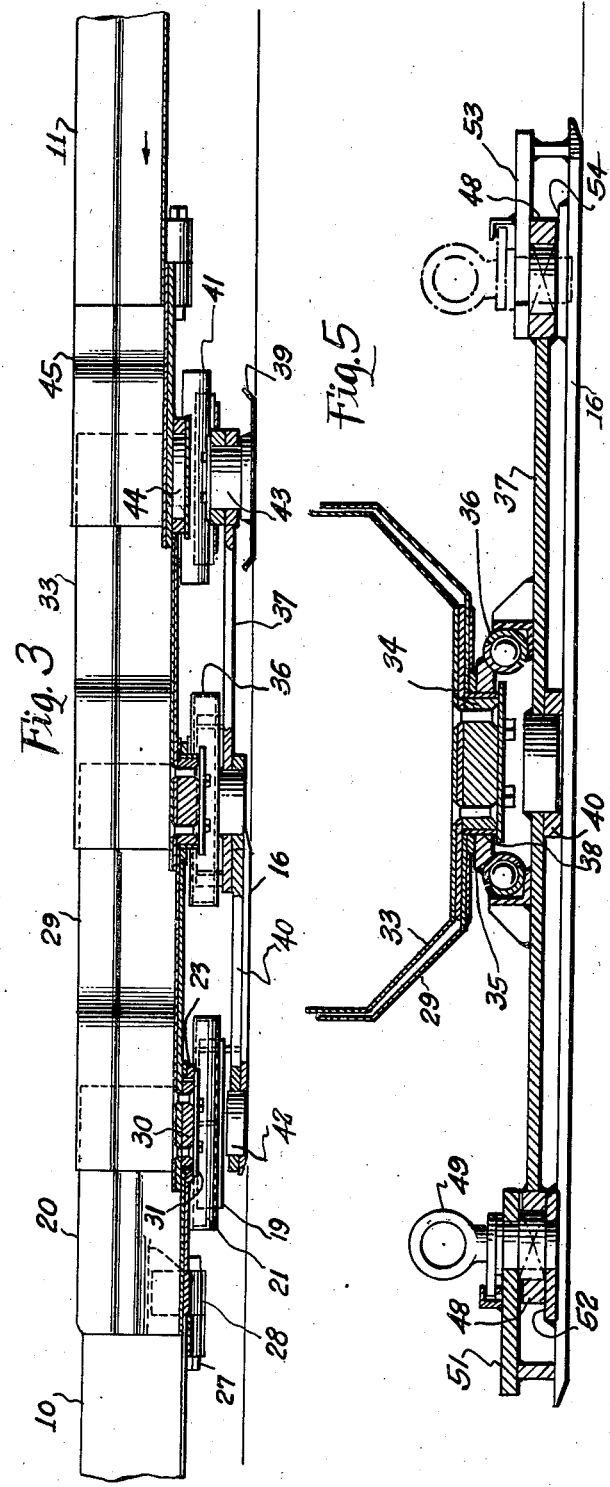
INVENTOR
Ernst R. Bergmann
BY
Clarence F. Poole
ATTORNEY Patented Feb. 18, 1941

2,232,650

UNITED STATES PATENT OFFICE 2,232,650

SHAKER CONVEYER

Ernst R. Bergmann, Chicago, Ill., assignor to Goodman Manufacturing Company, Chicago, Ill., a corporation of Illinois Application August 25, 1939, Serial No. 291,964

13 Claims. (Cl. 198—220)

This invention relates to improvements in shaker conveyers, and has among other objects to provide a novel form of swivel connection in a shaker conveyer trough line, so arranged as to be adjustable to permit an increased range of swinging movement of the forward end of the conveyer trough line, to enable a pick-up member or shovel on the forward end of the conveyer to be positioned laterally with respect to the trough line and extend along a cross entry, to pick up material therefrom, or to pick up material from remote corners of a wide room.

A further object of my invention is to provide an articulated connection between a driving and driven trough section of a conveyer, permitting swinging movement of one trough section with respect to the other, which includes an adjustable guide and support member movably mounted on a base, and forming a laterally adjustable support for one end of the driven trough section of the conveyer and adjacent ends of intermediate connecting trough sections, arranged to minimize side thrust on the driven trough section of the conveyer when in extreme angular positions with respect to the driving trough section of the conveyer.

Other objects of my invention will appear from time to time as the following specification proceeds and with reference to the accompanying drawings wherein:

Figure 1 is a fragmentary plan view of a shaker conveyer trough line having an extensible shovel on the forward end thereof, with a swivel constructed in accordance with my invention interposed between the driving and driven trough sections of the conveyer;

Figure 2 is an enlarged fragmentary view somewhat similar to Figure 1, with the swivel in a different position of adjustment than in Figure 1, and with certain parts broken away and certain other parts shown in section in order to more clearly illustrate certain details of my invention;

Figure 3 is an enlarged fragmentary longitudinal sectional view of the swivel as positioned in Figure 1;

Figure 4 is a sectional view taken substantially along line 4—4 of Figure 2;

Figure 5 is an enlarged sectional view taken substantially along line 5—5 of Figure 1; and Figure 6 is an enlarged sectional view taken substantially along line 6—6 of Figure 2.

In the drawings, the embodiment of my invention illustrated is shown as being connected between a driving trough section 10 of a shaker conveyer trough line and a forward driven trough section 11, to permit lateral swinging movement of the driven trough section so that a shovel 12 on the forward end of the conveyer may pick up material from extreme corners of a wide room, or may be extended along a cross cut or entry at an angle to the main part of the conveyer, to pick up material therefrom. The conveyer trough line is driven from a suitable reciprocating drive mechanism in a usual manner (not shown). The shovel 12 on the forward end of the conveyer is herein shown as being on the forward end of an extensible trough section 13, nested within the driven trough section 11 and adapted to be extended therefrom or retracted therein by a suitable friction grip type of feeding mechanism of a well-known type and indicated generally by reference character 15 (see Figure 1).

Referring now in particular to the details of the novel form of swivel of my invention, a base 16 is provided. Said base is adapted to be held in fixed relation with respect to the ground by means of the usual form of jacks interposed between said base and the mine roof. A trough supporting and guide frame, generally indicated by reference character 19, is mounted at the rear end of said base, and forms a reciprocating guide and support for a connecting trough section 20 and the forward end of the driving trough section 10. Said guide frame may be of any type well known to those skilled in the art, but is herein shown as being of the well-known ball type, including two pairs of spaced apart longitudinally extending facing raceways 21, 21 of a semi-circular formation, which have balls 22, 22 mounted therebetween for movement therealong (see Figures 2 and 6). The upper raceways 21, 21 are secured to a support plate 23, which is secured to the bottom of the forward end of the connecting trough section 20. Said connecting trough section is adapted to be detachably connected to the forward end of the driving trough section 10 in a suitable manner; as, for instance, nuts and bolts 27, 27 extending through aligned eyes 28, 28 on adjacent ends of said trough sections (see Figures 2 and 3).

The connecting trough section 20 has a flared and outwardly curved forward end and sides which are adapted to conform to and receive a flared and outwardly curved rear end of an intermediate connecting trough section 29. Said intermediate connecting trough section is pivotally connected to the forward end of the trough section 20 by means of a depending boss 30, secured to the lower side of the trough section 29. Said boss extends through an apertured bearing portion of the connecting trough section 20 and the support member 23, and has a retaining plate 31 detachably secured to the underside thereof, to prevent upward lifting movement of said intermediate connecting trough section with respect to the connecting trough section 20.

The intermediate connecting trough section 29 likewise has a flared and outwardly curved forward end and sides, and has a corresponding rear end of an intermediate connecting trough section 33 nested therein and pivotally mounted for lateral swinging movement with respect thereto on a bearing boss 34, depending from the bottom of the trough section 33. Said bearing boss is encircled by a sleeve 38 which extends through the bottom of the trough section 33 and a transverse support member 35, forming a part of a ball and guide frame 36, and forms a bearing support for said trough section on said guide frame, permitting pivotal movement of said frame with respect to said trough section (see Figure 5). Said ball and guide frame is similar to the ball and guide frame 19 hereinbefore described, so is not herein described in detail.

The guide frame 36 is mounted on and secured to an adjustable guide and supporting member 37, which is mounted on the base 16, for pivotal adjustable movement with respect thereto. Said adjustable guide and support member 37, as herein shown, is a T-shaped formation slidably mounted on the base 16 and having a forwardly projecting stem which is slidably supported on the ground at its forward end on a ground engaging shoe 39. Movement of said support member along said base is controlled by a control link 40, which is pivotally connected at one of its ends to the rear end of said support member, intermediate the ends thereof. The other end of said control link is pivotally connected to the base 16, for movement about an axis coaxial with the axis of swinging movement of the trough section 29, on a bearing boss 42 (see Figure 6).

A ball and guide frame 41 is pivotally mounted on the forwardly projecting end of the support member 37 on an upwardly projecting bearing boss 43. Said ball and guide frame is similar to the ball and guide frames 19 and 36, so will not herein be described in detail, and forms a support for the forward end of the intermediate connecting trough section 33. Said trough section has connection with said ball and guide frame by means of a bearing boss 44 (see Figures 3 and 4). Said bearing boss is secured to the bottom of a connecting trough section 45, adjacent the rear end thereof, and extends through and is rockable with respect to the trough section 33. Said bearing boss is also secured to a transverse plate 46, forming a part of the upper frame portion of the ball frame 41. The ball frame 41 may thus pivot about the axis of the bearing boss 44 upon swinging movement of the connecting trough section 45. Said last mentioned trough section has the rear end of the driven trough section 11 detachably secured thereto in the usual manner.

The guide and support member 37 is provided with apertured bosses 48, 48 at its opposite ends (see Figures 1 and 2). Either one of the apertures of said bosses is adapted to be engaged by a locking pin 49, to hold said guide and support member stationary during reciprocation of the conveyer. Said locking pin is adapted to register for engagement with any one of a plurality of spaced apertures 50, 50 provided in a plate 51, which is secured to and spaced above the top of the base 16, adjacent one side thereof, and with suitable apertures in a plate 52 mounted on the top of the base 16, as is clearly shown in Figure 5. Similar vertically spaced, horizontally disposed apertured plates 53 and 54 are provided on the opposite side of said base, to permit the opposite end of said guide and support member to be connected thereto when it is desired to position the driven trough section 11 in an opposite direction from that shown in Figure 2.

When it is desired to swing the extensible trough section and shovel 12 laterally, to pick up loose material from the central part of the mine room, the guide and support member 37 may be locked in a central position, as shown in Figure 1, by the pin 49 registering for engagement with the extreme forward end aperture 50 of the plate 51, and with the corresponding aperture in the plate 52. This permits lateral swinging movement of said extensible trough section about the axis of connection of the trough section 45 to the trough section 33, and holds the intermediate trough section 29 in alignment with the driving trough section 10.

When, however, it is desired to swing said extensible trough section a further amount, as is shown in Figure 2, to permit the pick-up member or shovel 12 to gather material from a breakthrough, or from the extreme corners of a wide room, the guide and support member 37 may be locked in the desired angular position by the pin 49 registering with the desired aperture 50 in the plate 51 and with the aperture in the boss 48, in the hereinbefore described manner. When it is desired to swing said extensible trough section in an opposite extreme position from that shown in Figure 2, the support and guide member 37 may be positioned in an opposite angular position with respect to the trough section 10 and locked in the desired position by the pin 49 registering with the desired apertures in the plates 53 and 54 and the opposite boss 48.

It should here be noted that when the guide and support member 37 is in various extreme angular positions of adjustment, the angles between the guide frames 19, 36 and 41 decrease towards the driven trough section 11 so that the angle between the guide frames 36 and 41 is less than the angle between the guide frames 19 and 41. This reduces the angular side thrust to the driven trough section 11, which would be present if the two guide frames were connected together by a rigid member, and likewise enables the conveying action of the driven trough section 11 to be substantially the same as that of the driving trough section 10.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In a shaker conveyer, a driving trough section, a driven trough section, and an articulated connection between said driving and driven trough sections permitting swinging movement of one with respect to the other including a base, a guide and support member mounted on said base for adjustable movement with respect thereto, means for locking said guide and support member in various positions of adjustment, said guide and support member having said driven trough section mounted thereon for pivotal and reciprocable movement with respect thereto and forming a support for a pair of intermediate articulated connecting trough sections connected between said driving and driven trough sections.

2. In a shaker conveyer, a driving trough section, a driven trough section, and an articulated connection between said driving and driven trough sections permitting lateral swinging movement of one with respect to the other including a pair of intermediate connecting trough sections, a base, a guide and support member mounted on said base for adjustable movement with respect thereto, and a pair of spaced apart trough supporting and guiding members slidably mounted on said support member, one of said trough supporting members having said driven trough pivotally connected thereto and said other supporting member having adjacent ends of said intermediate connecting trough sections pivotally connected thereto.

3. In a shaker conveyer, a driving trough section, a driven trough section, and an articulated connection between said driving and driven trough sections permitting swinging movement of one with respect to the other including a base, a guide and support member mounted on said base for adjustable movement with respect thereto, said guide and support member having said driven trough section mounted thereon for pivotal and reciprocable movement with respect thereto and forming a support for a pair of intermediate articulated connecting trough sections pivotally connected between said driving and driven trough sections, and means for controlling movement of said guide and support member along said base including a control link connected between said base and said guide and support member.

4. In a shaker conveyer, a driving trough section, a driven trough section, and an articulated connection between said driving and driven trough sections permitting swinging movement of one with respect to the other including a base, a guide and support member mounted on said base for adjustable movement with respect thereto, said guide and support member having said driven trough section mounted thereon for pivotal and reciprocable movement with respect thereto and forming a support for a pair of intermediate articulated connecting trough sections disposed between said driving and driven trough sections, means for controlling movement of said guide and support member along said base including a control link connected between said base and said guide and support member, and means selectively engageable with said guide and support member for holding it from movement and permitting its adjustment to various angular positions with respect to said driving trough section.

5. In a shaker conveyer, a driving trough section, a driven trough section, and an articulated connection between said driving and driven trough sections permitting swinging movement of one with respect to the other including a base, a guide and support member mounted on said base for pivotal movement with respect thereto, a control link pivotally mounted on said base and having pivotal connection with said guide and support member, for controlling pivotal movement thereof, and a pair of spaced apart trough supporting members mounted on said member, one of said supporting members having said driven trough pivotally connected thereto, and said other supporting member having adjacent ends of intermediate connecting trough sections pivotally connected thereto.

6. In a swivel for a shaker conveyer trough line including a driving and driven trough section, a base forming a reciprocable support for the forward end of said driving trough section, a guide and support member mounted on said base for adjustable movement with respect thereto, a control link for controlling movement of said member with respect to said base, means for selectively holding said member from movement, and said guide and support member forming an adjustable support for said driven trough section, permitting lateral swinging movement of said trough section with respect to said support, and also forming a support for adjacent ends of the intermediate articulated connecting trough sections.

7. In a swivel for a shaker conveyer trough line including a driving and driven trough section, a base, a reciprocably movable guide member mounted on said base and forming a support for the forward end of said driving trough section, a guide and support member mounted on said base for lateral swinging movement with respect thereto, means for selectively holding said guide and support member from movement, and a pair of spaced apart guide members mounted on said guide and support member, one of said guide members being secured to said guide and support member for movement therewith and having adjacent ends of a pair of intermediate trough sections pivotally connected thereto, and the other of said guide members being pivotally movable with respect to said guide and support member and having said driven trough section mounted thereon.

8. In a swivel for a shaker conveyer trough line including a driving and driven trough section, a base, a reciprocably movable guide member mounted on said base and forming a support for the forward end of said driving trough section, a guide and support member mounted on said base for lateral swinging movement with respect thereto, means for selectively locking said guide and support member in position, a control link connected between said base and guide and support member for controlling pivotal movement of said member along said base, a pair of spaced apart guide members mounted on said guide and support member, one of said guide members being mounted for movement with said guide and support member and having adjacent ends of a pair of intermediate connecting trough sections pivotally connected thereto, the other of said guide members having said driven trough section mounted thereon, and a connection between said last mentioned guide member and said driven trough section, to pivot said member upon pivotal movement of said driven trough section.

9. In a swivel for a shaker conveyer trough line including a driving and driven trough section, a base, a pair of intermediate connecting trough sections connecting said driving and driven trough sections together, to form a continuous articulated trough between said driving and driven trough sections when said driving trough section is in various angular positions of adjustment with respect to said driven trough section, and an adjustable support for adjacent ends of said connecting trough sections and the rear end of said driven trough section permitting pivotal movement of said driven trough section with respect to said connecting trough sections including a guide and support member mounted on said base for pivotal movement with respect thereto about a pair of spaced apart axes and means for selectively locking said guide and support member in various angular positions of adjustment with respect to said base.

10. In a swivel for a shaker conveyer trough line including a driving and driven trough section, a base, a pair of articulated intermediate connecting trough sections connecting said driving and driven trough sections together, to form a continuous articulated trough between said driving and driven trough sections when said driving trough section is in various angular positions of adjustment with respect to said driven trough section, and an adjustable support for adjacent ends of said connecting trough sections and the rear end of said driven trough section permitting pivotal movement of said driven trough section with respect to said connecting trough sections including a guide and support member mounted on said base for pivotal movement with respect thereto about a pair of spaced apart axes, a reciprocably movable guide member mounted on said guide and support member, pivotal connections between said guide member and adjacent ends of said connecting trough sections, and another reciprocably movable guide member pivotally mounted on the forward end of said guide and support member and having said driven trough section mounted thereon.

11. In a swivel for a shaker conveyer trough line including a driving and driven trough section, a base, a pair of articulated intermediate connecting trough sections connecting said driving and driven trough sections together, to form a continuous articulated trough between said driving and driven trough sections when said driving trough section is in various angular positions of adjustment with respect to said driven trough section, and an adjustable support for adjacent ends of said connecting trough sections and the rear end of said driven trough section, permitting pivotal movement of said driven trough section with respect to said connecting trough sections including a guide and support member mounted on said base for pivotal movement with respect thereto about a pair of spaced apart axes and having a forwardly projecting end extending beyond the forward end of said base, a reciprocably movable guide member mounted on said guide and support member, and a vertical pivotal connection between said guide member and adjacent ends of said connecting trough sections, another reciprocably movable guide member pivotally mounted on the forward end of said guide and support member and having said driven trough section secured thereto, and means engageable with either end of said guide and support member for selectively locking it in various desired positions of adjustment with respect to said base.

12. In a swivel for a shaker conveyer trough line, a driving trough section, a driven trough section spaced from and driven by said driving trough section, a base, a reciprocable supporting connection between said base and the forward end of said driving trough section, a guide and support member mounted on said base, a reciprocable supporting connection between the rear end of said driven trough section and said guide and support member, for positioning the rear end of said driven trough section laterally with respect to said base, means for connecting the adjacent discharge and receiving ends of said trough sections together to form a continuous trough when said trough sections are in various positions of adjustment with respect to each other, and means connected between said base and said guide and support member for controlling movement of said guide and support member with respect to said base.

13. In a swivel for a shaker conveyer trough line, a driving trough section, a driven trough section spaced from and driven by said driving trough section, a base, a reciprocable supporting connection between said base and the forward end of said driving trough section, a guide and support member mounted on said base, a reciprocable supporting connection between the rear end of said driven trough section and said guide and support member, for positioning the rear end of said driven trough section laterally with respect to said base, means for connecting the adjacent discharge and receiving ends of said trough sections together to form a continuous trough when said trough sections are in various positions of adjustment with respect to each other, means connected between said base and said guide and support member for controlling movement of said guide and support member with respect to said base, and means for selectively holding said guide and support member in various positions of adjustment during reciprocation of the conveyer.

ERNST R. BERGMANN.